United States Patent
Harasin et al.

(10) Patent No.: US 7,772,353 B2
(45) Date of Patent: Aug. 10, 2010

(54) FAST CURING ALIPHATIC RIM ELASTOMERS

(75) Inventors: Stephen J. Harasin, Morgan, PA (US);
Richard R. Roesler, Wexford, PA (US);
Rick V. Starcher, Monaca, PA (US);
Carol L. Kinney, Eighty Four, PA (US);
James T Garrett, Palmyra, VA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 827 days.

(21) Appl. No.: 11/300,958

(22) Filed: Dec. 15, 2005

(65) Prior Publication Data

US 2007/0142609 A1 Jun. 21, 2007

(51) Int. Cl.
*C08G 18/18* (2006.01)
*C08G 18/22* (2006.01)
*C08G 18/40* (2006.01)
*C08G 18/48* (2006.01)
*C08G 18/65* (2006.01)

(52) U.S. Cl. .......................... 528/52; 528/55; 528/70; 528/80; 528/85

(58) Field of Classification Search .................. 528/52, 528/55, 77, 85, 70, 80
See application file for complete search history.

(56) References Cited

U.S. PATENT DOCUMENTS

| | | | |
|---|---|---|---|
| 4,218,543 A | 8/1980 | Weber et al. | 521/51 |
| 4,269,945 A | 5/1981 | Vanderhider et al. | 521/159 |
| 4,642,320 A | 2/1987 | Turner et al. | 521/176 |
| 4,764,543 A | 8/1988 | Savina | 521/160 |
| 4,772,639 A | 9/1988 | Pilger et al. | 521/124 |
| 5,260,346 A | 11/1993 | Cassidy et al. | 521/159 |
| 5,502,147 A | 3/1996 | Nodelman et al. | 528/49 |
| 5,502,150 A | 3/1996 | Steppan et al. | 528/60 |
| 5,656,677 A | 8/1997 | Jourquin et al. | 521/126 |
| 5,962,142 A | 10/1999 | Tachi et al. | 428/423.1 |
| 6,242,555 B1 | 6/2001 | Du Prez et al. | 528/52 |
| 6,268,057 B1 | 7/2001 | Mizuno et al. | 428/423.3 |
| 2004/0019175 A1 | 1/2004 | Trossaert et al. | 528/44 |

*Primary Examiner*—Milton I Cano
*Assistant Examiner*—Benjamin J Gillespie
(74) *Attorney, Agent, or Firm*—N. Denise Brown; Noland J. Cheung

(57) ABSTRACT

This invention relates to polyurethane elastomers and to a process for their production. These elastomers comprise the reaction product of a (cyclo)aliphatic isocyanate component having an NCO group content of about 20 to about 45%, with an isocyanate-reactive component comprising one or more polyether polyols which is free of amine groups, and a low molecular weight organic compound containing two hydroxyl groups and which is free of amine groups, in the presence of one or more catalysts.

20 Claims, No Drawings

FAST CURING ALIPHATIC RIM ELASTOMERS

BACKGROUND OF THE INVENTION

This invention relates to fast curing aliphatic RIM elastomers and to a process for their production.

The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are suitable for a commercial RIM process are the aromatic isocyanates such as, for example, diphenyl methane-4,4'-diisocyanate (i.e. MDI). While various patents broadly disclose cycloaliphatic isocyanates in a long list of isocyanates which are described as suitable for use in a RIM process, few patents have any working examples wherein a cycloaliphatic isocyanate is used.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanate-3,3,5-trimethyl-5-isocyanatomethylcyclohexane (IPDI), and (ii) polyisocyanates containing isocyanurate groups prepared by the trimerization of a portion of the isocyanate groups of 1,6-diisocyanatohexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing.

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500, (b) at least one chain extender, and (c) a (cyclo)aliphatic polyisocyanate, polyisothiocyanate, or mixture thereof, wherein the NCX index is from about 0.6 to 1.5. This process requires that component (a) have at least 25%, and preferably 50% of its active hydrogen atoms present in the form of amine hydrogens. All of the examples disclose a system based on a HDI prepolymer with amine terminated polyethers and diethyltoluenediamine at high mold temperatures and long demold times.

U.S. Pat. No. 4,764,543 discloses aliphatic RIM systems that use very fast reacting aliphatic polyamines. This patent is restricted to total polyurea systems based on chain extenders which are cycloaliphatic diamines and polyethers which are amine-terminated polyethers, with an aliphatically bound polyisocyanate.

RIM systems are also disclosed in U.S. Pat. No. 4,269,945. These systems are based on compositions comprising a polyisocyanate, a hydroxyl-containing polyol, and a specific chain extender. The specific chain extender comprises (1) at least one component selected from the group consisting of (a) a hydroxyl-containing material which is essentially free of aliphatic amine hydrogen atoms, and (b) aromatic amine-containing materials containing at least two aromatic amine hydrogen atoms and are essentially free of aliphatic amine hydrogen atoms; and (2) at least one aliphatic amine-containing material having at least one primary amine group and an average aliphatic amine hydrogen functionality of from about 2 to 16. Both aromatic polyisocyanates and (cyclo)aliphatic polyisocyanates are disclosed as being suitable for this process. All of the working examples in this patent use aromatic isocyanates that may be polymeric in nature.

U.S. Pat. No. 5,260,346 also discloses reaction systems for preparing elastomers via the RIM process. These systems require an allophanate modified polyisocyanate, a hydroxyl group containing polyol, and an aromatic polyamine in which at least one of the positions ortho to the amine group is substituted with a lower alkyl substituent.

U.S. Pat. No. 5,502,147 describes (cyclo)aliphatic isocyanate based RIM systems. These (cyclo)aliphatic isocyanates have a viscosity of less than 20,000 mPa·s at 25° C., an NCO functionality of 2.3 to 4.0, and are modified by isocyanurate groups, biuret groups, urethane groups, allophanate groups, carbodiimide groups, oxadiazine-trione groups, uretdione groups, and blends thereof. The B-side comprises a high molecular weight polyol and a low molecular weight chain extender in which the OH:NH ratio is from 1:1 to 25:1.

U.S. Pat. No. 5,502,150, which is commonly assigned, discloses a RIM process which uses a hexamethylene diisocyanate prepolymer having a functionality of less than 2.3, an NCO content of 5 to 25%, and a monomer content of less than 2% by weight. This prepolymer is reacted with a high molecular weight isocyanate-reactive compound, a chain extender selected from diols and aminoalcohols, and a hydroxyl-based crosslinking compound containing no more than one aliphatic amine hydrogen atom.

Light stable polyurethanes are also disclosed in U.S. Pat. Nos. 5,656,677 and 6,242,555. The polyurethanes of U.S. Pat. No. 5,656,677 comprise the reaction product of a (cyclo)aliphatic isocyanate with a compound containing isocyanate-reactive hydrogen atoms, in the presence of a chain extender and/or crosslinker, and a specific catalyst system. The catalyst system comprises 1) at least one organic lead compound, 2) at least one organic bismuth compound, and/or 3) at least one organic tin compound. The light stable elastomers of U.S. Pat. No. 6,242,555 comprise the reaction product of A) isophorone diisocyanate trimer/monomer mixture having an NCO group content of 24.5 to 34%, with B) an isocyanate-reactive component, in the presence of C) at least one catalyst selected from organolead (II), organobismuth (III) and organotin (IV) compounds.

Advantages of the present invention include improved cure, and simplified catalysis, without the need for a lead based catalyst. The present invention also does not require amine based polyols as part of the isocyanate-reactive component.

SUMMARY OF THE INVENTION

This invention relates to fast curing aliphatic RIM elastomers and to a process for their production.

These polyurethane elastomers comprise the reaction product of:
(A) an isocyanate component having an NCO group content of about 20 to about 45% by weight, a functionality of about 2.0 to about 2.7, preferably about 2.1 to about 2.3, and comprising a trimerized (cyclo)aliphatic polyisocyanate, with the proviso that (i) when the (cyclo)aliphatic polyisocyanate is trimerized isophorone diisocyanate, component (A) contains less than 20% (preferably less than 10% and more preferably less than 5%) by weight of trimerized hexamethylene diisocyanate, and (ii) when the (cyclo)aliphatic polyisocyanate is trimerized hexamethylene diisocyanate, component (A) contains less than 10% by weight of isophorone diisocyanate;

with (B) an isocyanate-reactive component comprising:
  (1) from about 70 to about 90% by weight, based on 100% by weight of (B), of one or more polyether polyols having a functionality of from about 2 to about 8 (preferably 2 to 4), a molecular weight of about 1000 to about 8,000 (preferably 2000 to 6000) and is free of (primary, secondary and/or tertiary) amine groups;
  and
  (2) from about 10 to about 30% by weight, based on 100% by weight of (B), of one or more organic compounds having a molecular weight of from about 62 to about 400, (preferably 62 to 90), having a hydroxyl functionality of 2 to 3, and is free of (primary, secondary and/or tertiary) amine groups, in the presence of
(C) one or more catalysts corresponding to the formula:

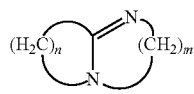

wherein:
  m: represents an integer from 3 to 8, preferably from 3 to 4;
  and
  n: represents an integer from 3 to 8, preferably from 3 to 5;
and, optionally,
(D) one or more additives (including ultraviolet stabilizers, pigments etc.).

The relative amounts of components (A) and (B) are such that the isocyanate index of the resultant elastomer ranges from about 100 to about 120.

In an alternate embodiment of the present invention, the polyisocyanate component (A) comprises a prepolymer which comprises the reaction product of (1) at least about 65% to less than 100% by weight, based on 100% by weight of the polyisocyanate component, of the trimerized (cyclo) aliphatic polyisocyanate described above, and (2) from greater than 0% to about 35% by weight, based on 100% by weight of the polyisocyanate component, of an isocyanate-reactive component having from about 2 to about 6, preferably 2 to 4 hydroxyl groups capable of reacting with NCO groups of (1) and a molecular weight of about 60 to about 4,000, in which the NCO group content of the prepolymer is from about 10% to about 35%.

The process for the production of these polyurethane elastomer comprising reacting a reaction mixture by a reaction injection molding technique. This reaction mixture corresponds to that described above.

DETAILED DESCRIPTION OF THE INVENTION

Suitable (cyclo)aliphatic polyisocyanates to be used as component (A) in the present invention include isocyanurates of a (cyclo)aliphatic diisocyanate such as, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, α,α,α',α'-tetramethyl-1,3- and/or -1,4-xylylene diisocyanate, 1-isocyanato-1-methyl-4(3)-isocyanatomethyl cyclohexane, dicyclohexylmethane-4,4'-diisocyanate, 2,4- and/or ,6-hexahydrotoluylene diisocyanate, and mixtures thereof. It is preferred that the isocyanate comprise 1,6-hexamethylene diisocyanate, dicyclohexylmethane-4,4'-diisocyanate, 1-isocyanato-3-isocyanatomethyl-3,5,5-trimethylcyclo-hexane, etc. Most preferred isocyanates include hexamethylene diisocyanate, dicyclohexylmethane diisocyanate, and 1-isocyanato-3-isocyanatomethyl-3,5,5-trimethylcyclohexane.

Polyisocyanurates or polyisocyanates which contain isocyanurate groups, i.e. the so-called trimers of polyisocyanates are suitable as component (A). Suitable trimers of polyisocyanates include compounds which can be prepared by processes such as described in, for example, U.S. Pat. Nos. 4,288,586 and 4,324,879, the disclosures of which are herein incorporated by reference; European Patents 3,765, 10,589 and 47,452, the disclosures of which are herein incorporated by reference; and German Offenlegungsschriften 2,616,416, herein incorporated by reference. The isocyanato-isocyanurates generally have an average NCO functionality of 2.0 to 2.7, preferably of 2.1 to 2.3, and an NCO content of 20 to 45%, preferably 20 to 40% by weight, more preferably about 20 to about 35%, and most preferably about 25 to about 31%.

Trimers of hexamethylene diisocyanate (HDI) typically have an NCO functionality of 2.0 to 2.7, preferably of 2.1 to 2.3, and an NCO content of 30 to 45% and preferably 35 to 45% by weight. Trimers of dicyclohexylmethane diisocyanate (rMDI) typically have an NCO functionality of 2.0 to 2.7, preferably of 2.1 to 2.3, and an NCO content of 19 to 31% and preferably 20 to 30% by weight. Trimers of isophorone diisocyanate (IPDI) typically have an NCO functionality of 2.0 to 2.7, preferably of 2.1 to 2.3, and an NCO content of 22 to 37% and preferably 26 to 32% by weight.

Prepolymers of these polyisocyanates, and particularly of the trimerized polyisocyanates described above, are also suitable to be used as component (A) in accordance with the present invention. Preparation of the prepolymer of the polyisocyanates of the present invention comprises reacting a (cyclo)aliphatic polyisocyanate as described above with a suitable isocyanate-reactive compound, such as, for example, a polyether polyol, polyester polyol, or low molecular weight polyol. The isocyanate-reactive compounds suitable for the present invention typically have a molecular weight of about 60 to about 4,000 and have a hydroxyl functionality of about 2 to about 6.

In accordance with the present invention, the isocyanate-reactive compounds used to make prepolymers typically have a molecular weight of at least about 60, preferably at least about 75, more preferably at least about 100 and most preferably at least about 130. The isocyanate-reactive compounds also typically have a molecular weight of less than or equal to about 4,000, preferably less than or equal to 1,000, more preferably less than or equal to about 400 and most preferably less than or equal to about 200. The isocyanate-reactive compounds may have a molecular weight ranging between any combination of these upper and lower values, inclusive, e.g.

from about 60 to about 4,000, preferably from about 75 to about 1,000, more preferably from about 100 to about 400, and most preferably from about 130 to about 200.

Also, the isocyanate-reactive compounds used to make prepolymers typically have a functionality of at least about 2, and typically less than or equal to about 6, preferably less than or equal to about 4, and more preferably less than or equal to about 3. The isocyanate-reactive compounds may have a functionality ranging between any combination of these upper and lower values, inclusive, e.g. from about 2 to about 6, preferably from about 2 to about 4, and more preferably from about 2 to about 3.

Examples of suitable isocyanate-reactive compounds include polyether polyols, polyester polyols, low molecular weight polyols, etc. All of these compounds are known in the field of polyurethane chemistry.

Suitable polyether polyols may be prepared by the reaction of suitable starting compounds which contain reactive hydrogen atoms with alkylene oxides such as, for example, ethylene oxide, propylene oxide, butylene oxide, styrene oxide, tetrahydrofuran, epichlorohydrin, and mixtures thereof. Suitable starting compounds containing reactive hydrogen atoms include compounds such as, for example, ethylene glycol, propylene glycol, butylene glycol, hexanediol, octanediol, neopentyl glycol, cyclohexanedimethanol, 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, glycerine, trimethylolpropane, pentaerythritol, water, methanol, ethanol, 1,2,6-hexane triol, 1,2,4-butane triol, trimethylolethane, mannitol, sorbitol, methyl glycoside, sucrose, phenol, resorcinol, hydroquinone, 1,1,1- or 1,1,2-tris-(hydroxyphenyl)ethane, etc.

Suitable polyester polyols include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety.

Suitable polythioethers, polyacetals, polycarbonates and other polyhydroxyl compounds are also disclosed in the above-identified U.S. Patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

Suitable low molecular weight polyols for preparing prepolymers include, for example, diol, triols, tetrols, and alkoxylation products of these. These include 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, tetrapropylene glycol, glycerol, trimethylolpropane, neopentyl glycol, cyclohexanedimethanol, 2,2,4-trimethylpentane-1,3-diol, pentaerythritol, etc. Alkoxylation products of these same compounds may also be used to prepare prepolymers. In accordance with the present invention, preferred isocyanate-reactive compounds to form prepolymers are trimethylolpropane and tripropylene glycol.

As previously mentioned, preferred polyisocyanates include the prepolymers of trimers of (cyclo)aliphatic polyisocyanates. These polyisocyanates are prepared by first, forming the isocyanurate group containing (cyclo)aliphatic polyisocyanate as described above, and then reacting the isocyanurate-group containing polyisocyanate with a suitable isocyanate-reactive compound to form the prepolymer. The prepolymers of polyisocyanurates suitable for the present invention typically have an NCO group content of from about 10 to 35%, preferably from about 12 to about 29%, and more preferably from about 16 to about 24%, and a functionality of from about 2 to about 6, preferably from about 2 to about 4.

Preferred polyisocyanates to be trimerized are selected from the group consisting of hexamethylene diisocyanate, isophorone diisocyanate and dicyclohexylmethane diisocyanate. For prepolymers of trimerized HDI, the broad NCO group content is from 12 to 29, and the functionality is from 2.0 to 6.0, and preferred NCO group content is from 16 to 24 and preferred functionality is from 2.0 to 4.0; for prepolymers of trimerized IPDI, the broad NCO group content is from 12 to 29, and the functionality is from 2.0 to 6.0; preferred NCO group content is from 16 to 24 and preferred functionality is from 2.1 to 2.3; and for prepolymers of trimerized rMDI, the broad NCO group content is from 12 to 29, and the functionality is from 2.0 to 6.0; preferred NCO group content is from 16 to 24 and preferred functionality is from 2.0 to 4.0.

In accordance with the present invention, residues of isocyanates which may inherently result in the production of some/all of the above described isocyanates after treatment are not suitable for the isocyanate component herein. Such residues are undesirable by-products of the process for the production of the isocyanate components.

Suitable compounds to be used as component (B)(1) in accordance with the present invention include, for example, polyether polyols. The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture, alone or successively to suitable starter compounds which contain reactive hydrogen atoms. Examples of suitable starter compounds include, but are not limited to, propylene glycol, glycerin, ethylene glycol, butylene glycol, diethylene glycol, triethylene glycol, dipropylene glycol, tripropylene glycol, water, trimethylolpropane, tetraethylene glycol, pentaerythritol, bisphenol A, sucrose, sorbitol, etc.

As would be recognized by one of ordinary skill in the art, these types of polyether polyols contain relatively high amounts of unsaturation.

Preferred polyethers include, for example, those alkoxylation products (preferably of ethylene oxide and/or propylene oxide) based on di- or tri-functional starters such as, for example, water, ethylene glycol, propylene glycol, glycerin, trimethylolpropane, etc.

Suitable compounds to be used as (B)(1) in accordance with the present invention include those having a molecular weight of from about 1,000 to about 8,000, preferably 2,000 to about 6,000, and a hydroxyl functionality of about 2 to about 8, and preferably of about 2 to about 4. In accordance with the present invention, compounds suitable for component (B)(1) herein are free of primary, secondary and/or tertiary amine groups.

Suitable compounds to be used as (B)(2) in accordance with the present invention include those having a molecular weight of from about 62 to about 400, a hydroxyl functionality of about 2 or 3 and which are free of primary, secondary and/or tertiary amine groups. These compounds preferably have a molecular weight of from about 62 to about 90.

Some examples of suitable compounds to be used as component (B)(2) herein include compounds such as 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, tetrapropylene glycol, cyclohexanedimethanol, and 2,2,4-trimethylpentane-1,3-diol, trimethylolpropane, pentaerythritol, glycerol. Preferred diols include, for example, ethylene glycol, and trimethylol propane.

In accordance with the present invention, the reaction of component (A) with component (B) is in the presence of (C) one or more catalysts corresponding to the formula:

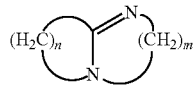

wherein:
m: represents an integer from 3 to 8, preferably from 3 to 4;
and
n: represents an integer from 3 to 8, preferably from 3 to 5.

Some examples of suitable catalysts which correspond to the above identified formula include 1,8-diaza-7-bicyclo[5.4.0]undec-7-ene (i.e. DBU), 1,5-diazabicyclo[4.4.0]dec-5-ene (i.e. DBD), 1,5-diazabicyclo-[4.3.0]non-5-ene (i.e. DBN), 1,8-diazabicyclo[7.5.0]tetra-dec-8-ene, 1,8-diazabicyclo[7.4.0]tridec-8-ene, 1,8-diazabicyclo[7.3.0]-dodec-8-ene, etc.

In accordance with the present invention, the amount of catalyst corresponding to the above structure present is such that there is at least about 0.1% to about 6.0% by weight preferably from about 0.5% to about 2.5%, and more preferably from about 1% to about 1.5% by weight, based on 100% by weight of component (B).

In accordance with the present invention, it is also possible that other catalysts which are known to be suitable for the preparation of polyurethanes may be present. Suitable catalysts include, for example, the known metal carboxylates, metal halides, ammonium carboxylates, tin-sulfur catalysts, and tertiary amine catalysts. Suitable metals for these catalysts include, but are not limited to, tin, bismuth, lead, mercury, etc. Of these catalysts, it is preferred to use tin carboxylates and/or tertiary amines in combination with the above described "diazabicyclo" catalysts.

Suitable metal carboxylates include tin carboxylates such as, for example, dimethyltin dilaurate, dibutyltin dilaurate, dibutyltin di-2-ethyl-hexoate, dibutyltin maleate, and bismuth carboxylates, such as, for example, bismuth trineodecanoate. Some suitable examples of metal halides include, for example, tin halides and particularly, tin chlorides such as, for example, dimethyltin dichloride and dibutyltin dichloride. Suitable examples of ammonium carboxylates include, for example, trimethyl-hydroxyethylammonium-2-ethylhexanoate (i.e. Dabco TMR). As previously mentioned, tin carboxylates such as, for example, dimethyltin dilaurate, and dibutyltin dilaurate are preferred metal carboxylate catalysts to be used in conjunction with the above described catalysts of the specified formula. Other suitable catalysts include tin-sulfur catalysts such as, for example, dialkyltin dilaurylmercaptides such as, for example, dibutyltin dilaurylmercaptide and dimethyltin dilaurylmercaptide. Some examples of suitable tertiary amine catalysts include compounds such as, for example, triethylamine, triethylenediamine, tributylamine, N-methyl-morpholine, N-ethylmorpholine, triethanolamine, triisopropanolamine, N-methyldiethanolamine, N-ethyldiethanolamine, and N,N-dimethylethanol-amine.

In accordance with a preferred embodiment of the present invention, it is preferred to use a catalyst which corresponds to the formula set forth above in combination comprising one or more tin carboxylate catalysts. Preferred tin carboxylates comprise dimethyltin dilaurate and/or dibutyltin dilaurate.

When a combination of two or more catalysts is used in accordance with the preferred embodiment of the present invention, the total amount of both catalysts should generally fall within the quantities previously-disclosed. In other words, the total amount of all catalysts present should be such that there is at least about 0.1% to about 6.0% by weight of all catalysts, preferably from about 0.5% to about 2.5%, more preferably from about 1% to about 1.5% by weight of all catalysts, based on 100% by weight of component (B). If the preferred combination of an amine catalyst having a structure corresponding to that described above and a tin carboxylate catalyst is used in the present invention, it is preferred that the amine catalyst (of the above structure) is present in an amount of from 50 to 90% by weight, and the tin carboxylate catalyst is present in an amount of from 10 to 50% by weight, with the sum of the %'s by weight totaling 100% by weight of the catalyst component. More specifically, this would typically result in the amine catalyst corresponding the specified formula accounting for from 50 to 90% by weight of the 0.1 to 6.0% by weight of total catalyst; and the tin carboxylate catalyst accounting for from about 10 to about 50% by weight of the 0.1 to 6.0% by weight of total catalyst, with the sum of the %'s by weight of the individual catalysts totaling 100% by weight of the catalysts.

Suitable stabilizers for the present invention include light stabilizers which are considered to include any of the known compositions which are capable of preventing significant yellowing in the elastomers of the present invention. As used herein, light stabilizer may be understood to include hindered amine light stabilizers, ultraviolet (UV) absorbers, and/or antioxidants.

Some examples of hindered amine light stabilizers include, but are not limited to, compounds such as, for example, those derived from 2,2,6,6-tetraalkylpiperidine moieties, other types of hindered amines such as those containing morpholinones, piperazinones, piperazindiones, oxazolidines, imidazolines, and the like. Specific examples of suitable hindered amine light stabilizers include compounds such as, but are not limited to, bis(2,2,6,6-tetramethyl-4-piperidyl)sebacate, bis(1,2,2,6,6-pentamethyl-4-piperidyl)sebacate, 2-methyl-2-(2,2,6,6-tetramethyl-4-piperidyl)amino-N-(2,2,6,6-tetramethyl-4-piperidyl)propionamide, bis(1,2,2,6,6-pentamethyl-4-piperidyl)-2-(3,5-di-tert-butyl-4-hydroxybenzyl)-2-n-butylmalonate, tetrakis(2,2,6,6-tetramethyl-4-piperidyl)-1,2,3,4-butanetetracarboxylate, poly[{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}], poly[(6-morpholino-1,3,5-triazine-2,4-diyl){(2,2,6,6-tetramethyl-4-piperidyl)

imino}hexamethylene{(2,2,6,6-tetramethyl-4-piperidyl) imino}], a polycondensate of dimethyl succinate and 1-(2-hydroxyethyl)-4-hydroxy-2,2,6,6-tetramethylpiperidine, a polycondensate of N,N-bis(3-aminopropyl)ethylenediamine and 2,4-bis[N-butyl-N-(1,2,2,6,6-pentamethyl-4-piperidyl) amino]-6-chloro-1,3,5-triazine, a polycondensate of 1,2,2,6, 6-pentamethyl-4-piperidinol and 3,9-bis-(2-hydroxy-1,1-dimethylethyl)-2,4,8,10-tetraoxaspiro[5.5]undecane with 1,2,3,4-butanetetracarboxylic acid and bis(1-octoxy-2,2,6,6-tetramethyl-4-piperidyl)sebacate.

The benzofranone stabilizers include compounds such as, for example, 5,7-di-tert-butyl-3-(3,4-dimethylphenyl)-3H-benzofuran-2-one and the like. The semicarbazide stabilizer includes, for example, 1,6-hexamethylenebis(N,N-dimethylsemicarbazide), 4,4'-(methylenedi-p-phenylene)bis(N,N-diethylsemicarbazide), 4,4'-(methylenedi-p-phenylene)bis (N,N-diethylsemicarbazide), 4,4'-(methylenedi-p-phenylene)bis(N,N-diisopropylsemicarbazide), α,α-(p-xylylene)bis(N,N-dimethylsemicarbazide), 1,4-cyclohexylenebis(N,N-dimethylsemicarbazide) and the like.

Suitable ultraviolet (UV) stabilizers for the present invention include compounds such as, for example, 2-(3-tert-butyl-2-hydroxy-5-methyl-phenyl)-5-chlorobenzotriazole, 2-(3,5-di-tert-butyl-2-hydroxyphenyl)benzotriazole, 2-(2-hydroxy-5-methylphenyl)benzotriazole, 2-(2-hydroxy-5-tert-octylphenyl)benzotriazole, 2-(3,5-di-tert-amyl-2-hydroxyphenyl)benzotriazole, 2-[2-hydroxy-3,5-bis(α,α-dimethylbenzyl)phenyl]benzotriazole, 2-hydroxy-4-octoxybenzophenone, 2-hydroxy-4-methoxybenzophenone, 2,4-di-tert-butylphenyl-3,5-di-tert-butyl-4-hydroxybenzoate, n-hexadecyl-3,5-di-tert-butyl-4-hydroxybenzoate, ethyl-2-cyano-3,3-diphenylacrylate, 2,4-dihydroxybenzophenone, 2,2',4,4'-tetrahydroxybenzophenone, 2-(2-hydroxy-4-octoxyphenyl)benzotriazole, 2-[2-hydroxy-3,5-bis (α,α-dimethyl-benzyl)phenyl]-2H-benzotriazole, 2-(3,5-di-tert-butyl-2-hydroxyphenyl)-5-chlorobenzotriazole, a condensate of methyl 3-[3-tert-butyl-5-(2H-benzotriazole-2-yl)-4-hydroxyphenyl]propionate and polyethylene glycol (molecular weight: about 300), a hydroxyphenyl-benzotriazole derivative, 2-(4,6-diphenyl-1,3,5-triazine-2-yl)-5-hexyloxyphenol and 2-[4,6-bis(2,4-dimethylphenyl)-1,3,5-triazine-2-yl]-5-octyloxyphenol, etc., as well as mixtures thereof.

Some examples of suitable antioxidants which are useful in the present invention include compounds such as n-octadecyl-3,5-di-tert-butyl-4-hydroxyhydrocinnamate; neopentanetetrayl tetrakis(3,5-di-tert-butyl-4-hydroxyhydrocinnamate); di-n-octadecyl 3,5-di-tert-butyl-4-hydroxybenzylphosphonate; 1,3,5-tris(3,5-di-tert-butyl-4-hydroxybenzyl)-isocyanurate; 1,3,5-trimethyl-2,4,6-tris(3,5-di-tert-butyl-4-hydroxybenzyl)-benzene; 3,6-dioxaoctamethylene bis(3-methyl-5-tert-butyl-4-hydroxyhydrocinnamate); 2,2'-ethylidene-bis(4,6-di-tert-butylphenol); 1,3,5-tris(2,6-dimethyl-4-tert-butyl-3-hydroxybenzyl)isocyanurate; 1,1,3-tris(2-methyl-4-hydroxy-5-tert-butylphenyl)butane; 1,3,5-tris[2-(3,5-di-tert-butyl-4-hydroxyhydrocinnamoyloxy)ethyl]isocyanurate; 3,5-di-(3,5-di-tert-butyl-4-hydroxybenzyl)mesitol; 1-(3,5-di-tert-butyl-4-hydroxyanilino)-3,5-di(octyl-thio)-s-triazine; N,N'-hexamethylene-bis(3,5-di-tert-butyl-4-hydroxyhydrocinnamamide); ethylene bis[3,3-di(3-tert-butyl-4-hydroxyphenyl)butyrate]; bis(3,5-di-tert-butyl-4-hydroxyhydrocinnamoyl)hydrazide; N,N-di-($C_{12}$-$C_{24}$ alkyl)-N-methyl-amine oxides; etc. Other suitable compounds to be used as antioxidants herein include alkylated monophenols such as, for example, 2,6-di-tert-butyl-4-methylphenol, 2-tert-butyl-4,6-dimethylphenol, 2,6-dicyclopentyl-4-methylphenol, 2,6-dioctadecyl-4-methylphenol, 2,4,6-tricyclohexylphenol, 2,6-di-tert-butyl-4-methoxymethylphenol, etc.; alkylated hydroquinones such as, for example, 2,6-di-tert-butyl-4-methoxyphenol, 2,5-di-tert-butyl-hydroquinone, 2,5-di-tert-amyl-hydro-quinone, 2,6-diphenyl-4-octadecyloxyphenol, etc.; hydroxylated thio-diphenyl ethers such as, for example, 2,2'-thio-bis-(6-tert-butyl-4-methyl-phenol), 2,2'-thio-bis-(4-octylphenol), 4,4'-thio-bis-(6-tert-butyl-2-methyl-phenol), etc.; alkylidene-bisphenols such as, for example, 2,2'-methylene-bis-(6-tert-butyl-4-methylphenol), 2,2'-methylene-bis-(4-methyl-6-cyclo-hexylphenol), 2,2'-methylene-bis-(6-nonyl-4-methylphenol), 2,2'-methyl-ene-bis-[6-(α-methylbenzyl)-4-nonylphenol], 2,2'-methylene-bis-[6-(α,α-dimethylbenzyl)-4-nonylphenol], 4,4'-methylene-bis-(2,6-di-tert-butyl-phenol), 2,6-di-(3-tert-butyl-5-methyl-2-hydroxybenzyl)-4-methylphenol, 1,1,3-tris-(5-tert-butyl-4-hydroxy-2-methylphenyl)butane, di-(3-tert-butyl-4-hydroxy-5-methylphenyl)dicyclopentadiene, di-[2-(3'-tert-butyl-2'-hydroxy-5'-methyl-benzyl)-6-tert-butyl-4-ethyl phenyl]terephthalate, etc.; benzyl compounds such as, for example, 1,3,5-tri-(3,5-di-tert-butyl-4-hydroxy-benzyl)-2,4,6-trimethylbenzene, di-(3,5-di-tert-butyl-4-hydroxybenzyl)-sulfide, bis-(4-tert-butyl-3-hydroxy-2,6-dimethylbenzyl)dithiol terephthalate, etc.; acylaminophenols such as, for example, 4-hydroxy-lauric acid anilide, 4-hydroxy-stearic acid anilide, 2,4-bis-octylmercapto-6-(3,5-tert-butyl-4-hydroxyanilino)-s-triazine, etc.; amides of β-(3,5-di-tert-butyl-4-hydroxy-phenyl)propionic acid such as, for example, N,N'-di-(3,5-di-tert-butyl-4-hydroxyphenylpropionyl)hexamethylenediamine, etc.; diarylamines such as, for example, diphenylamine, N-phenyl-1-naphthyl-amine, N-(4-tert-octylphenyl)-1-naphthylamine, etc.

In accordance with the present invention, one or more pigments and/or dyes, including organic and inorganic compounds, may also be present. Suitable inorganic pigments include, for example, oxide pigments such as iron oxides, titanium dioxide, nickel oxides, chromium oxides and cobalt blue and also zinc sulfides, ultramarine, sulfides of the rare earths, bismuth vanadate and also carbon black, which is considered a pigment for the purposes of this invention. Particular carbon blacks are the acidic to alkaline carbon blacks obtained by the gas or furnace process and also chemically surface-modified carbon blacks, for example sulfo- or carboxyl-containing carbon blacks. Suitable organic pigments include, for example, those of the monoazo, disazo, laked azo, β-naphthol, Naphthol AS, benzimidazolone, diazo condensation, azo metal complex, isoindolinone and isoindoline series, also polycyclic pigments for example from the phthalocyanine, quinacridone, perylene, perinone, thioindigo, anthraquinone, dioxazine, quinophthalone and diketopyrrolopyrrole series. Suitable pigments also include solid solutions of the pigments mentioned, mixtures of organic and/or inorganic pigments with organic and/or inorganic pigments such as, for example, carbon black coated metal, mica or talc pigments, for example mica CVD-coated with iron oxide, and also mixtures between the pigments mentioned. Other suitable pigments include laked dyes such as Ca, Mg and Al lakes of sulfo- and/or carboxyl-containing dyes. Also suitable are pigments from the group of the azo metal complex pigments or their tautomeric forms which are known. Other suitable pigments include, for example, metal flake pigments of, for example, aluminum, zinc, or magnesium. It is also possible that the metal flake, particularly aluminum flake, could be leafing or non-leafing.

Other suitable additives which may be present in accordance with the invention include surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene-diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the foam stabilizers and surface-active agents, other additives which may be used in the molding compositions of the present invention include known blowing agents including nitrogen, cell regulators, flame retarding agents, plasticizers, adhesion promoters, fillers and reinforcing agents such as glass in the form of fibers or flakes or carbon fibers.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded products of the present invention are prepared by reacting the components in a closed mold via the RIM process. The compositions according to the present invention may be molded using conventional processing techniques at isocyanate indexes ranging from about 90 to 120 (preferably from 100 to 110. By the term "Isocyanate Index" (also commonly referred to as NCO index), is defined herein as the equivalents of isocyanate, divided by the total equivalents of isocyanate-reactive hydrogen containing materials, multiplied by 100.

In general, in a RIM process, two separate streams are intimately mixed and subsequently injected into a suitable mold, although it is possible to use more than two streams. The first stream contains the polyisocyanate component, while the second stream contains the isocyanate reactive components and any other additive which is to be included.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples of the present application:

Isocyanate A: a trimer of isophorone diisocyanate having an NCO group content of about 29% and a functionality of about 2.3, prepared by the partial trimerization of isophorone diisocyanate in the presence of N,N,N-trimethylbenzene-methanaminium hydroxide catalyst to a trimer to monomer ratio of about 65 weight % to 35 weight %.

Polyol A: a polyether polyol having a nominal functionality of about 3, an OH number of about 28, a molecular weight of about 6000, and comprising the reaction product of glycerin with propylene oxide and capped with ethylene oxide in the presence of a KOH catalyst EG: ethylene glycol Catalyst A: dimethyltin dilaurate catalyst, commercially available as Fomrez UL-28 from GE Silicones Catalyst B: 1,8-diazobicyclco(5.4.0)undec-7-ene catalyst, commercially available as Polycat DBU from Air Products Surfactant A: a silicone surfactant, commercially available as Niax L-1000 from GE Silicones General Procedure:

The components described above were used to produce reaction injected molded articles. The specific materials and the amounts of those materials used are reported in Table 1 which follows.

The polyurethane-forming systems of Examples 1-2 were injected using a MiniRIM cylinder machine. The isocyanate-reactive materials and various additives were put into the B-side of the machine, and the appropriate quantities of the isocyanate component were loaded into the A-side. The MiniRIM was equipped with a Hennecke mq8 Mixhead. The B-side was preheated to 90° F. and the A-side was heated to 90° F. The materials were injected at an injection pressure of 200 bar and an injection rate of 400 grams/sec. The material was injected into a flat plaque mold of 3×200×300 mm heated to about 165° F. After a 60 second dwell time, the part was demolded. Physical properties were determined in accordance with ASTM standards.

The following ASTM test methods were used in the working examples of the present application.

ASTM Tests

| Property | ASTM Test Number |
| --- | --- |
| Flexural Modulus | D 3489 (D 790 Method I) |
| Shore A Hardness | HA2240 |
| Shore D Hardness | HD2240 |
| Tear Strength | D624 |
| Tensile Strength | D412 |
| Ultimate % Elongation | D412 |
| Compression Set | D395 |

TABLE 1

Formulations for Examples 1-2

|  | Example 1 | Example 2 |
| --- | --- | --- |
| Polyol A | 88 | 88 |
| EG | 11 | 12 |
| Catalyst A | 0.5 | 0.5 |
| Catalyst B | 1 | 1 |
| Surfactant A | 1 | 1 |
| Iso A | 57.6 | 62.26 |
| Isocyanate Index | 105 | 105 |
| Gel Time (sec) | 6 | 6 |
| Shot Time (sec) | 0.9 | 0.9 |
| Demold Time (sec) | 60 | 60 |
| Density (pcf) | 65 | 65 |
| No. of Samples | 6 | 6 |

TABLE 2

Properties of Examples 1-2

|  | Example 1 | Example 2 |
| --- | --- | --- |
| Density (pcf) | 64.85 | 65.25 |
| Flex Modulus (psi) | 9580 | 6758 |
| Hardness - Shore A @ 1 sec. | 88 | 88 |
| Hardness - Shore D @ 1 sec. | 33 | 32 |
| Tear Strength - Die C (pli) | 255 | 239 |
| Tensile Strength (psi) | 1864 | 2399 |
| Elongation (%) | 227 | 242 |
| Compression Set @ 25% (%) | 46 | 45 |

Of the six samples prepared according to the formulation in Table 1 for each of Examples 1 and 2, two of the samples were submitted for physical testing. There were 2-3 replicates of each test for each sample. The results reported in Table 2 represent the average of these for each of Examples 1 and 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane elastomer comprising reacting a reaction mixture by a reaction injection molding technique, wherein the reaction mixture comprises:
   (A) a polyisocyanate component having an NCO group content of about 20 to about 45% by weight, a functionality of about 2.0 to about 2.7, and comprising a trimerized (cyclo)aliphatic polyisocyanate, with the proviso that (i) when the (cyclo)aliphatic polyisocyanate is trimerized isophorone diisocyanate, component (A) contains less than 20% by weight of trimerized hexamethylene diisocyanate, and (ii) when the (cyclo)aliphatic polyisocyanate is trimerized hexamethylene diisocyanate, component (A) contains less than 10% by weight of isophorone diisocyanate;
   with
   (B) an isocyanate-reactive component which is free of amine groups and comprising:
      (1) from about 70 to about 90% by weight, based on 100% by weight of (B), of one or more polyether polyols having a functionality of from about 2 to about 8, a molecular weight of about 1,000 to about 8,000 g/mol and is free of amine groups;
      (2) from about 10 to about 30% by weight, based on 100% by weight of (B), of one or more organic compounds having a molecular weight of from about 62 to about 400 g/mol, having a hydroxyl functionality of 2 to 3, and is free of amine groups,
   in the presence of
   (C) one or more catalysts corresponding to the formula:

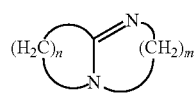

wherein:
      m: represents an integer from 3 to 8, and
      n: represents an integer from 3 to 8;
   and, optionally,
   (D) one or more additives;
   wherein the relative amounts of (A) and (B) are such that the isocyanate index ranges from about 90 to about 120.

2. The process of claim 1, wherein the polyisocyanate component comprises a prepolymer which comprises the reaction product of:
   (1) at least about 65% to less than 100% by weight, based on 100% by weight of the polyisocyanate component, of the trimerized (cyclo)aliphatic polyisocyanate,
   and
   (2) from greater than 0% to no more than about 35% by weight, based on 100% by weight of the polyisocyanate component, of an isocyanate-reactive component having from about 2 to about 6 hydroxyl groups capable of reacting with NCO groups of (1) and a molecular weight of about 60 to about 4,000 g/mol,
   wherein the NCO group content of the prepolymer is from about 10% to about 35%.

3. The process of claim 1, wherein the (cyclo)aliphatic polyisocyanate is selected from the group consisting of 1-isocyanato-3-isocyanatomethyl-3,5,5-trimethylcyclohexane, dicyclohexylmethane-4,4'-diisocyanate and 1,6-hexamethylene diisocyanate.

4. The process of claim 2, wherein the (cyclo)aliphatic polyisocyanate is selected from the group consisting of 1-isocyanato-3-isocyanatomethyl-3,5,5-trimethylcyclohexane, dicyclohexylmethane-4,4'-diisocyanate and 1,6-hexamethylene diisocyanate.

5. The process of claim 1, wherein (B)(1) has a functionality of 2 to 4 and a molecular weight of 2,000 to 6,000 g/mol.

6. The process of claim 1, wherein (B)(2) has a molecular weight of 62 to 90 g/mol.

7. The process of claim 2, in which (A)(2) has a molecular weight of 100 to 400 g/mol and a functionality of 2 to 3.

8. The process of claim 1, wherein (C) additionally comprises a tin catalyst.

9. The process of claim 1, wherein (D) said one or more additives comprises one or more stabilizers selected from the group consisting of antioxidants, hindered amine light stabilizers and ultraviolet stabilizers.

10. The process of claim 1, wherein (D) said one or more additives comprises one or more pigments and/or dyes.

11. A polyurethane elastomer comprising the reaction product of:
   (A) a polyisocyanate component having an NCO group content of about 20 to about 45% by weight, a functionality of about 2.0 to about 2.7, and comprising a trimerized (cyclo)aliphatic polyisocyanate,
      with the proviso that (i) when the (cyclo)aliphatic polyisocyanate is trimerized isophorone diisocyanate, component (A) contains less than 20% by weight of trimerized hexamethylene diisocyanate, and (ii) when the (cyclo)aliphatic polyisocyanate is trimerized hexamethylene diisocyanate, component (A) contains less than 10% by weight of isophorone diisocyanate;
   with
   (B) an isocyanate-reactive component which is free of amine groups and comprising:
      (1) from about 70 to about 90% by weight, based on 100% by weight of (B), of one or more polyether polyols having a functionality of from about 2 to about 8, a molecular weight of about 1,000 to about 8,000 g/mol and is free of amine groups;
      (2) from about 10 to about 30% by weight, based on 100% by weight of (B), of one or more organic compounds having a molecular weight of from about 62 to about 400 g/mol, having a hydroxyl functionality of 2 to 3, and is free of amine groups,
in the presence of
(C) one or more catalysts corresponding to the formula:

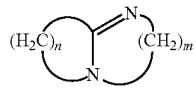

wherein:
   m: represents an integer from 3 to 8,
   and
   n: represents an integer from 3 to 8;
and, optionally,
(D) one or more additives;
wherein the relative amounts of (A) and (B) are such that the isocyanate index ranges from about 90 to about 120.

12. The elastomer of claim 11, wherein the polyisocyanate component comprises a prepolymer which comprises the reaction product of:
   (1) at least about 65% to less than 100% by weight, based on 100% by weight of the polyisocyanate component, of the trimerized (cyclo)aliphatic polyisocyanate,
   and
   (2) from greater than 0% to no more than about 35% by weight, based on 100% by weight of the polyisocyanate component, of an isocyanate-reactive component having from about 2 to about 6 hydroxyl groups capable of reacting with NCO groups of (1) and a molecular weight of about 60 to about 4,000 g/mol,
wherein the NCO group content of the prepolymer is from about 10% to about 35%.

13. The elastomer of claim 11, wherein the (cyclo)aliphatic polyisocyanate is selected from the group consisting of 1-isocyanato-3-isocyanatomethyl-3,5,5-trimethylcyclohexane, dicyclohexylmethane-4,4'-diisocyanate and 1,6-hexamethylene diisocyanate.

14. The elastomer of claim 12, wherein the (cyclo)aliphatic polyisocyanate is selected from the group consisting of 1-isocyanato-3-isocyanatomethyl-3,5,5-trimethylcyclohexane, dicyclohexylmethane-4,4'-diisocyanate and 1,6-hexamethylene diisocyanate.

15. The elastomer of claim 11, wherein (B)(1) has a functionality of 2 to 4 and a molecular weight of 2,000 to 6,000 g/mol.

16. The elastomer of claim 11, wherein (B)(2) has a molecular weight of 62 to 90 g/mol.

17. The elastomer of claim 12, in which (A)(2) has a molecular weight of 100 to 400 g/mol and a functionality of 2 to 3.

18. The elastomer of claim 11, wherein (C) additionally comprises a tin catalyst.

19. The elastomer of claim 11, wherein (D) said one or more additives comprises one or more stabilizers selected from the group consisting of antioxidants, hindered amine light stabilizers and ultraviolet stabilizers.

20. The elastomer of claim 11, wherein (D) said one or more additives comprises one or more pigments and/or dyes.

* * * * *